(12) United States Patent
Diamond

(10) Patent No.: US 12,184,620 B2
(45) Date of Patent: Dec. 31, 2024

(54) SYSTEMS AND METHODS FOR SIDE-CHANNEL-SECURE BLOCKCHAIN ANONYMITY USING I2P

(71) Applicant: Consensys Software Inc., Brooklyn, NY (US)

(72) Inventor: Benjamin Diamond, Brooklyn, NY (US)

(73) Assignee: CONSENSYS SOFTWARE INC., Brooklyn, NY (US)

( * ) Notice: Subject to any disclaimer, the term of this patent is extended or adjusted under 35 U.S.C. 154(b) by 333 days.

(21) Appl. No.: 17/775,506

(22) PCT Filed: Dec. 4, 2020

(86) PCT No.: PCT/US2020/063439
§ 371 (c)(1),
(2) Date: May 9, 2022

(87) PCT Pub. No.: WO2021/113732
PCT Pub. Date: Jun. 10, 2021

(65) Prior Publication Data
US 2022/0400101 A1    Dec. 15, 2022

Related U.S. Application Data

(60) Provisional application No. 62/943,435, filed on Dec. 4, 2019.

(51) Int. Cl.
H04L 29/06      (2006.01)
H04L 9/40       (2022.01)
H04L 67/104     (2022.01)

(52) U.S. Cl.
CPC ...... *H04L 63/0421* (2013.01); *H04L 63/0435* (2013.01); *H04L 67/104* (2013.01)

(58) Field of Classification Search
CPC ............. H04L 63/0421; H04L 63/0435; H04L 67/104; H04L 63/02; H04L 63/0281; H04L 63/04; H04L 63/0407
See application file for complete search history.

(56) References Cited

U.S. PATENT DOCUMENTS

2004/0223451 A1* 11/2004 Homma ................. H04L 12/56
                                                        370/395.42
2016/0294793 A1  10/2016 Larson et al.
2017/0012942 A1*  1/2017 Wittenschlaeger ..........................
                                                        H04L 63/0281

FOREIGN PATENT DOCUMENTS

WO      2019/116250      6/2019

OTHER PUBLICATIONS

Astolfi, Felipe, Jelger Kroese, and Jeroen Van Oorschot. "I2p-the invisible internet project." Leiden University Web Technology Report (2015). (Year: 2015).*

(Continued)

*Primary Examiner* — Malcolm Cribbs
(74) *Attorney, Agent, or Firm* — Renner, Otto, Boisselle & Sklar, LLP

(57) ABSTRACT

A blockchain anonymizing system and method is provided for side-channel-secure blockchain anonymity using the Invisible Internet Project (I2P). Instead of merely preventing the revelation of a user's IP address, embodiments are directed to inhibiting any correlation of the user's transactions over time.

17 Claims, 6 Drawing Sheets

(56) References Cited

OTHER PUBLICATIONS

International Preliminary Report on Patentability for corresponding PCT application PCT/US2020/063439 mailed on May 17, 2022.
Jonatan Bergquist et al: "On the Design of Communication and Transaction Anonymity in Blockchain-Based Transactive Microgrids", arxiv.org, Cornell University Library, 201 Olin Library Cornell University Ithaca, NY 14853, Sep. 27, 2017 (Sep. 27, 2017).
Blackpaper Verge Currency 5th Edition; Published Jan. 2019 Authored by CryptoRekt https://vergecurrency.com/static/blackpaper/verge-blackpaper.

\* cited by examiner

SYSTEMS AND METHODS FOR SIDE-CHANNEL-SECURE BLOCKCHAIN ANONYMITY USING I2P

RELATED APPLICATIONS

This application claims the benefit of PCT/US2020/063439 filed on Dec. 4, 2020; and U.S. 62/943,435 filed on Dec. 4, 2019. Which are herein incorporated by reference in its entirety.

TECHNICAL FIELD

The present disclosure relates generally to systems and methods for side-channel-secure blockchain anonymity using the Invisible Internet Project (I2P).

BACKGROUND

Much blockchain research and development has focused on attaining anonymity, which is typically defined as a cryptographic property whereby the originator of any particular transaction cannot be ascertained. Determining an originator's identity does not require, e.g., the discovery of the originator's name or IP address, or of any other meaningful attribute; rather, it may involve merely the attachment of any persistent (and arbitrary) identifier to the person's various transactions. Indeed, having tagged certain transactions with their originators' (possibly arbitrary) identifiers, an attacker can learn much (e.g., by analyzing timing behavior).

In standard Ethereum, each user operates a visible and persistent Ethereum account; this identifier alone threatens users' privacy. In the Anonymous Zether protocol, each transactor disguises its public key within an arbitrarily-sized anonymity set. This public key (namely the sender's) cannot be distinguished as such from the other members of the anonymity set by an onlooker.

This indistinguishability is cryptographic, as it is assumes that the attacker sees only the bytes published to the network (that is, as if the blockchain were an abstract bulletin board).

Yet in practice, the blockchain is not abstract, and, in particular, new transactions must be propagated to the network through a peer-to-peer network of TCP websockets. Even if transactions' contents do not identify their originators, their propagation patterns through the network could. Specifically, an attacker observing which peer is the first to deliver each successive message can (under certain conditions) associate with high probability and over time to each transaction its originating IP address. A successful execution of this attack is described in Koshy P., Koshy D., McDaniel P. (2014) *An Analysis of Anonymity in Bitcoin Using P2P Network Traffic*. In: Christin N., Safavi-Naini R. (eds) Financial Cryptography and Data Security. FC 2014. Lecture Notes in Computer Science, vol 8437. Springer, Berlin, Heidelberg and such attacks are further discussed in Giulia Fanti, Shaileshh Bojja Venkatakrishnan, Surya Bakshi, Bradley Denby, Shruti Bhargava, Andrew Miller, and Pramod Viswanath. 2018. *Dandelion++: Lightweight Cryptocurrency Networking with Formal Anonymity Guarantees*. Proc. ACM Meas. Anal. Comput. Syst. 2, 2, Article 29 (June 2018), the disclosures of which are hereby incorporated by reference in their entireties.

SUMMARY

Existing approaches to privacy at the transport layer typically seek to dissociate transactions only from their originating IP address, and do not prevent the correlation of successive transactions with each other. Additionally, existing approaches require introducing complicated implementation changes to the underlying blockchain and cannot be implemented as light forks.

According to a general embodiment, a blockchain anonymizing system and method is provided for side-channel-secure blockchain anonymity using the Invisible Internet Project (I2P). Instead of merely preventing the revelation of a user's IP address, embodiments are directed to inhibiting any correlation of the user's transactions over time.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
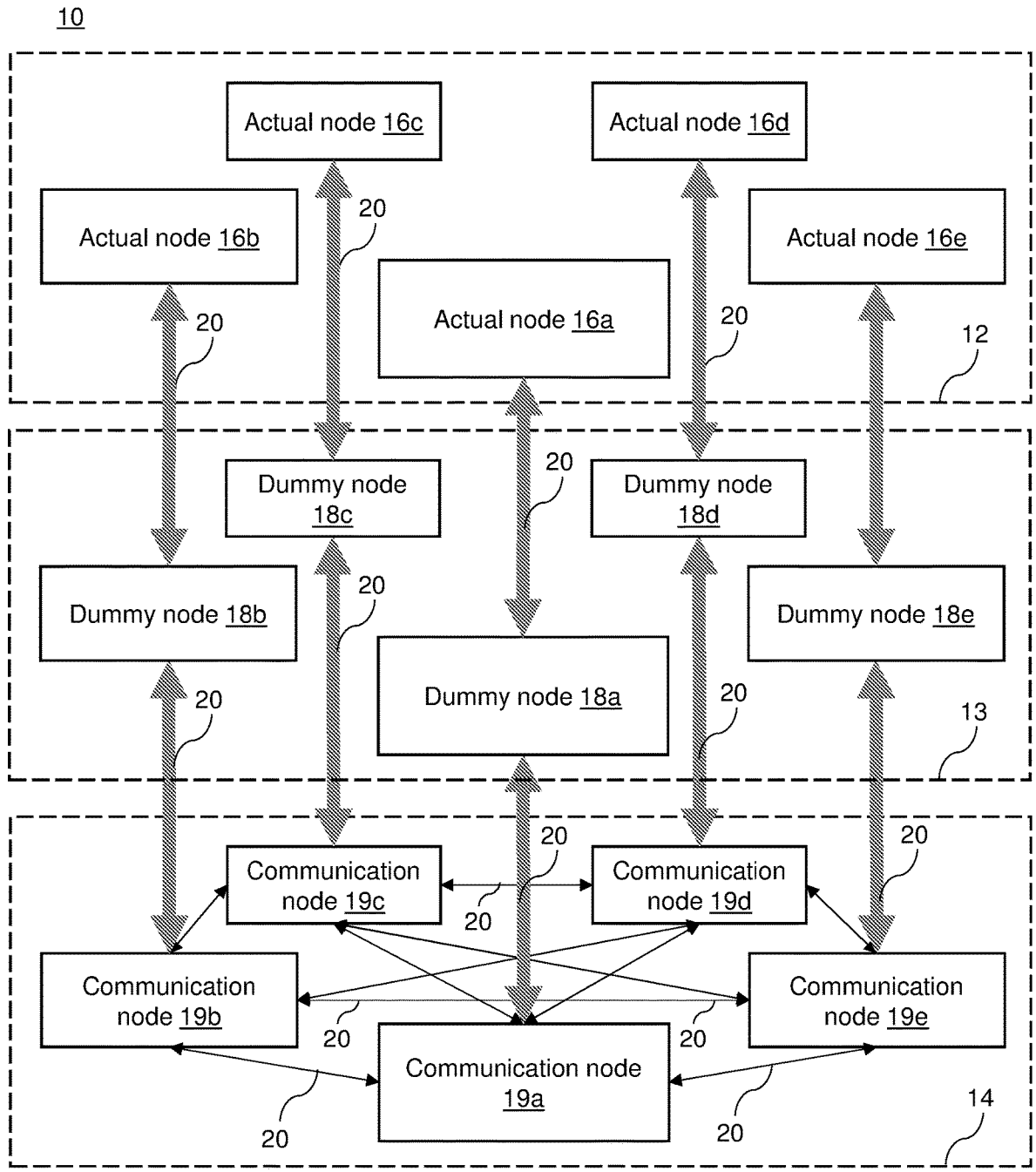
FIG. 1 is a block diagram of an anonymous blockchain network.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

A blockchain exists out of blocks of data. These blocks of data are stored on nodes. Nodes can be any suitable electronic device, such as personal computers, servers, etc. Nodes form the infrastructure of a blockchain and all nodes on a blockchain are connected to each other. Nodes constantly exchange the latest blockchain data with each other so all nodes stay up to date. Nodes store, spread and preserve the blockchain data. When a user attempts to add a new block of transactions to the blockchain, the user broadcasts the block to all the nodes on the network. Based on the block's legitimacy (validity of signature and transactions), nodes can accept or reject the block. When a node accepts a new block of transactions, it saves and stores it on top of the rest of the blocks it already has stored.

According to a general embodiment, a blockchain anonymizing system and method is provided for side-channel-secure blockchain anonymity using the Invisible Internet Project (I2P). Instead of merely preventing the revelation of a user's IP address, embodiments are directed to inhibiting any correlation of the user's transactions over time.

In the embodiment depicted in FIG. 1, an anonymous blockchain network 10 for side-channel-secure blockchain anonymity is shown. The network 10 includes actual nodes 16a-16e (collectively referred to as a peer-to-peer network layer 12), dummy nodes 18a-18e (collectively referred to as a dummy layer 13), and communication nodes 19a-19e of a communication network 14 (also referred to as a communication layer). The actual nodes 16 store blocks of data forming a blockchain. Each of the actual nodes 16 is associated with one of the dummy nodes 18 and each of the dummy nodes 18 is associated with one of the communication nodes 19.

As opposed to the actual nodes 16 communicating directly between one another or communicating directly with the communication network 14, each of the actual nodes 14 communicates with the other actual nodes 14 by sending outgoing communications to the associated dummy node 18. Each of the dummy nodes 18 is configured to propagate outgoing communications by receiving from the associated actual node 16 an outgoing communication 20 addressed to an intended recipient. The dummy node 18 passes the received outgoing communication to the associated communication node 19.

Upon receiving an outgoing communication 20, each of the communication nodes 19 is configured to send the outgoing communication to a recipient communication node (i.e., one of the other nodes of the communication network 14) identified by the outgoing communication. Similarly, upon receiving an incoming communication 20, each of the communication nodes 19 sends the incoming communication 20 to the associated dummy node 18. Each of the dummy nodes 18 is configured to propagate incoming communications 20 by receiving an incoming communication 20 from the associated communication node 19 and sending the received incoming communication 20 to the associated actual node 16.

As described above, embodiments involve disrupting the correlation of a user's identity across the user's subsequent transactions (over and above the mere dissociation of the user from the user's IP address). This disruption may be obtained through judicious use of I2P. In one embodiment, a local I2P proxy node (also referred to as a communication node 19) is disguised as an additional blockchain peer. For example, each node (also referred to as a peer and herein as an actual node 16) of the blockchain may instantiate a dummy peer (also referred to as a dummy node 18). The dummy peer may be executed by the instantiating node (e.g., run as a server on the node's computer's localhost). The dummy peer complies with the blockchain's peer-to-peer communication protocol (RLPx, in the case of Ethereum), and may appear to the instantiating node exactly as if it were just another peer. Internally, however, the dummy peer serves as an I2P-enabled inbound and outbound proxy to the rest of the network's dummy peers.

All actual peers 16 of the network (i.e., non-dummy peers 18) may be designated as "protected" non-anonymous nodes, to whom the actual nodes 16 will refuse to send direct peer-to-peer messages 20 (also referred to as communications). That is, each of the actual nodes 16 may be prevented from communicating directly with other actual nodes 16. The actual node 16 will, on the other hand, send transactions 20 (also referred to as communications) to the associated dummy peer 18, and the dummy peer 18 may decrypt all such transactions 20 and forward (the dummy peer 18 may maintain a list of the network's other dummy peers' I2P addresses) the transactions 20 to the network's other dummy peers 18 as anonymous I2P datagrams via the communication network 14. Symmetrically, upon receiving inbound I2P datagrams, the dummy peer 18 may package the inbound I2P datagrams into RLPx frames and forwards them back to the actual node 16. As described above, each of the dummy nodes 18 may comply with a peer-to-peer (P2P) communication protocol of the blockchain, such that the dummy node 18 appears as another peer to the associated actual node 16 according to the P2P communication protocol.

Figure 2A:
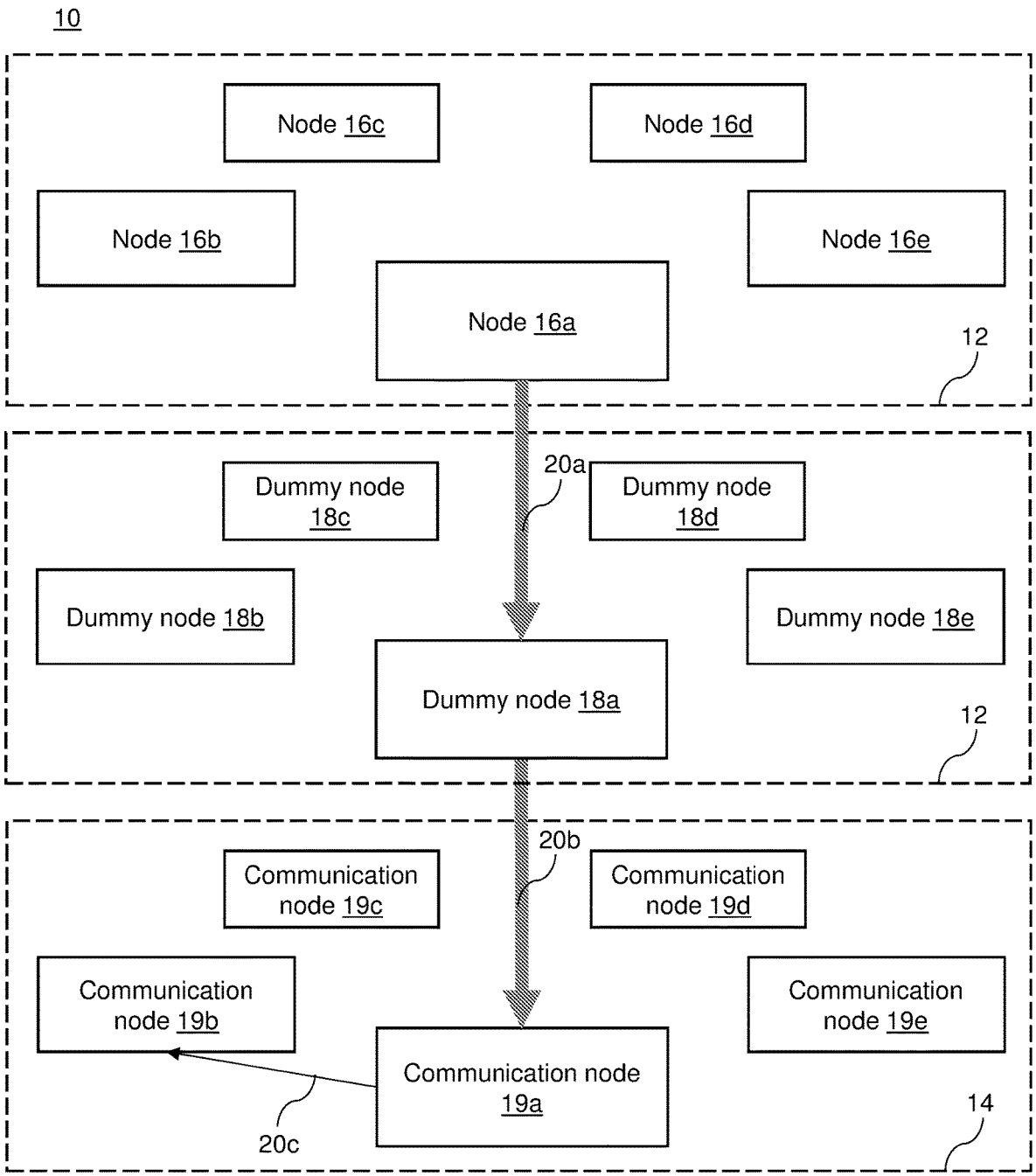
FIGS. 2A-2C depicts propagation of communications through the blockchain network of FIG. 1.
Figure 2B:
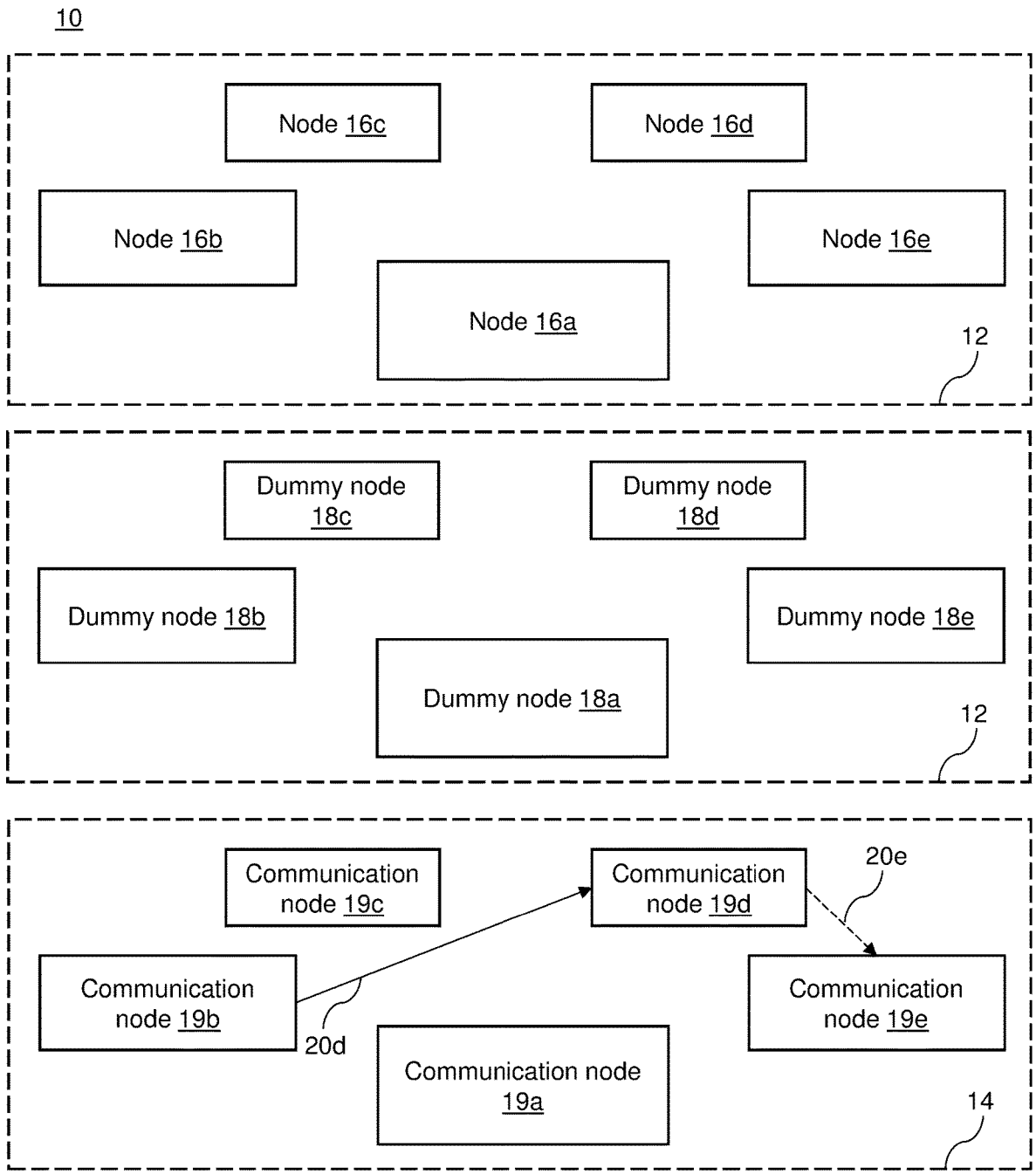
Figure 2C:
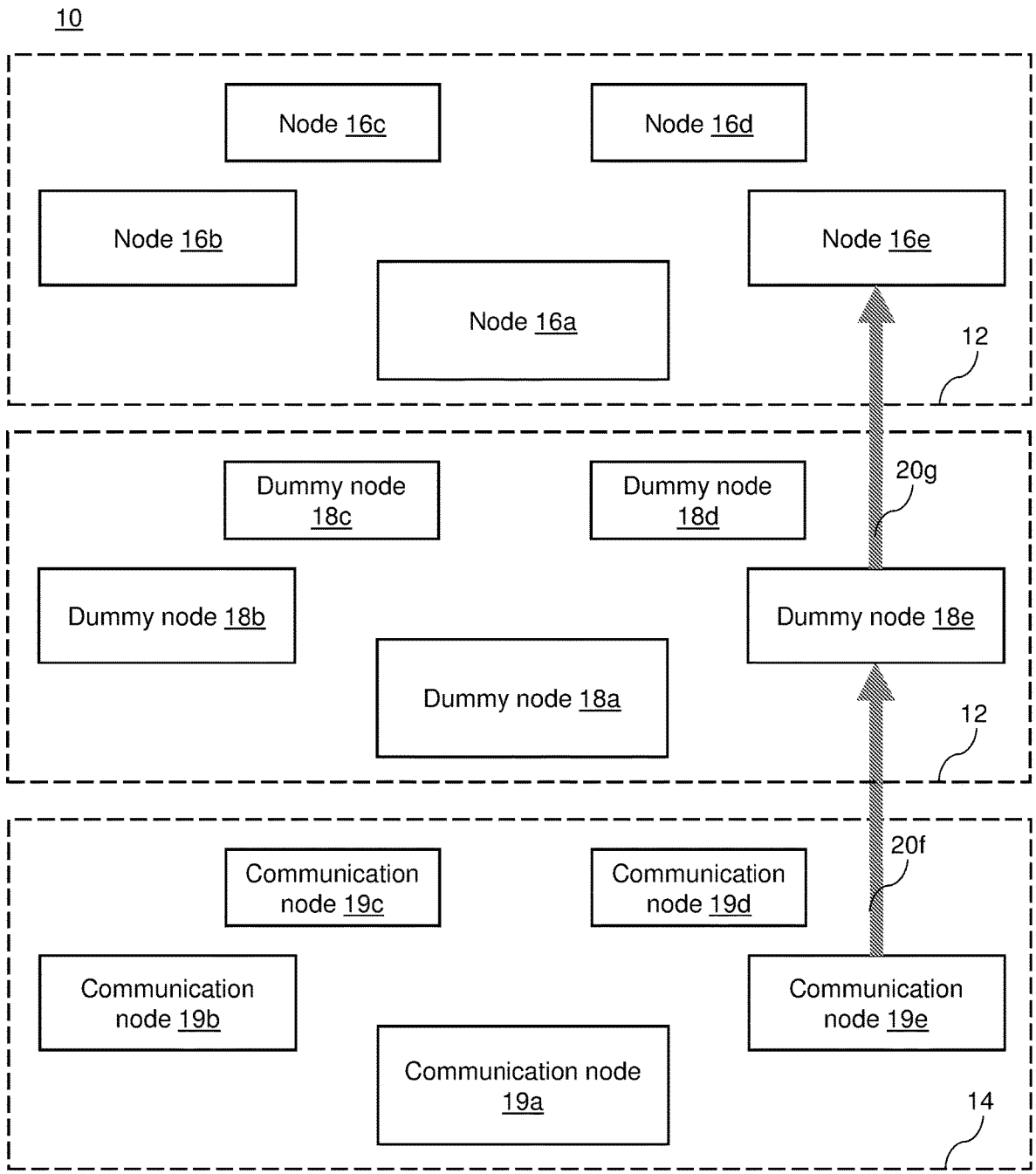

FIGS. 2A-2C depict an exemplary communication through the anonymous blockchain network 10. In this example, actual node 16a is sending a communication 20a to recipient node 16e. In FIG. 2A, communication is initiated by the sending node 16a passing the communication 20a to the sending dummy node 18a. The dummy node 18a then passes the communication 20b to the associated communication node 19a (i.e., the sending communication node). The communication node 19a then sends the communication 20c to another communication node 19b.

In FIG. 2B, communication node 19b receives the communication 20c and passes the communication 20d to the next communication node 19d. For example, the communication 20 may be encrypted using onion encryption where each communication node decrypts one layer of the communication 20 and determines a next recipient node. In this example, communication node 19b determines that the communication 20 is to be sent next to communication node 19d. Similarly, communication node 19d determines that the communication 20e is to be next sent to communication node 19e and communication node 19d sends the communication 20e to communication node 19e.

In FIG. 2C, because communication node 19e is the intended recipient of the communication 20f, the communication node 19e passes the communication 20f to dummy node 18e. Dummy node 18e receives the communication 20f and passes the communication 20g to actual node 16e.

Figure 3:
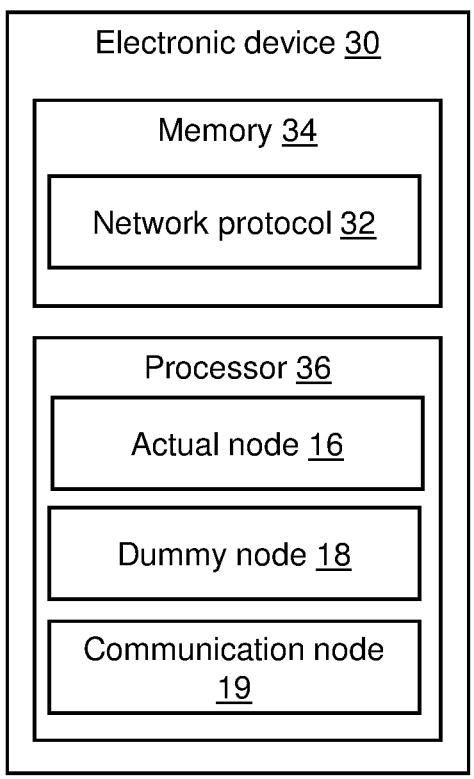
FIG. 3 is a schematic diagram of an electronic device.
Figure 4:
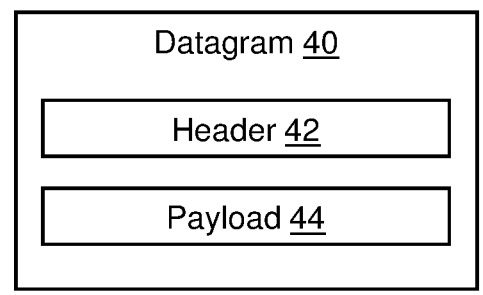
FIG. 4 is an embodiment of a datagram.

Each of the actual nodes 16 may be embodied as an electronic device 30. That is, each of the actual nodes 16 may be computer code executed by a computer. In the embodiment shown in FIG. 3, an electronic device 30 executes a network protocol 32 comprising computer readable instructions stored on a non-transitory computer readable medium 34 (also referred to as a memory) that, when executed by an electronic device 30 (e.g., a processor 36 of the electronic device 30), causes the electronic device 30 to function as one of the actual nodes 16. The network protocol 32 may also cause the electronic device 30 to instantiate the actual node 16, the dummy node 18 associated with the actual node 16, and the communication node 19 associated with the associated dummy node 19. That is, each of the actual nodes 16 may have instantiated the associated dummy node 18 and the associated communication node 19, such that each of the actual nodes 16 and the communication nodes 19 are executed on a same electronic device 30 as the associated dummy node 18.

The processor 36 may have various implementations. For example, the processor 36 may include any suitable device, such as a processor (e.g., CPU), programmable circuit, integrated circuit, memory and I/O circuits, an application specific integrated circuit, microcontroller, complex programmable logic device, other programmable circuits, or the like. The processor 36 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor 36. The processor 36 may be communicatively coupled to the computer readable medium and network interface through a system bus, mother board, or using any other suitable structure known in the art.

As described above, the communication network 14 may use the Invisible Internet Project (I2P), such that the communications are encrypted end-to-end. In one embodiment, each of the dummy nodes 18 serves as an I2P-enabled inbound and outbound proxy for the associated actual node 16.

I2P is an overlay network that allows a group of peers to communicate anonymously. Anonymous connections are achieved by encrypting the user's traffic (by using end-to-end encryption), and sending traffic through a network of computers, e.g., distributed around the world. When communications are sent using I2P, I2P bounces the communications through relay-like tunnels of peers. Given the high number of possible paths the traffic can transit, a third party watching a full connection is unlikely. In this way, I2P prevents each individual network participant (barring the participant's unilateral control of a large proportion of the network's peers) from determining any particular communication's sender, recipient, or contents.

Typically, I2P seeks merely to dissociate each user from the user's actual IP address (e.g., to protect the user from the user's ISP). By appropriately modifying its settings, however, one may use I2P to eliminate all persistent identifiers across a user's successive communications. In one embodiment, the communication 20 is a datagram 40. For example, datagram 40 may be a raw datagram including a header 42 and payload 44. The header 42 and/or payload 44 may be encrypted using a cryptographic tag 46. That is, a raw datagrams may be used, and only a cryptographic tag per datagram may be sent.

For example, two actual nodes 16 may have determined encryption tags to be used when communicating. To improve security, the two actual nodes 16 may use a different tag for each communication. The tags may be used to encrypt the header 42 and/or the payload 44 of the datagram 40. The recipient node of the communication 20 may not be encrypted so that a receiving communication node 20 is able to determine where to send the communication 20.

Datagrams are a basic transfer unit associated with a packet-switched network. Datagrams are typically structured in header and payload sections with the payload being the data to be transported and the header containing information for routing from the source (also referred to as the originating equipment) to the destination without relying on prior exchanges between the equipment and the network. Headers may include source and destination addresses as well as a type field. This nesting of data payloads in a tagged header is called encapsulation.

Datagrams provide a connectionless communication service across a packet-switched network. The source of the datagram provides the destination address, but receives no guarantee of delivery, and no confirmation upon successful delivery. Further, datagram service does not consider the order in which datagrams are sent or received. Datagram service is considered connectionless because it routes datagrams without first creating a predetermined path. For this reason, many datagrams in a same group may travel along different paths before reaching the same destination.

In one embodiment, before sending outgoing communications to the associated dummy node, each of the actual nodes 16 determine a type of the outgoing communication 20. When the type of the outgoing communication 20 is a standard type, the actual node 16 sends the communication without sending the outgoing communication to the associated dummy node 18. For example the actual node 16 may access a lookup table specifying types of communications 20 that are standard type. Communications having the type specified in the lookup table may be sent without routing the communication through the dummy nodes 18. Conversely, when the type of the outgoing communication 20 is a protected type (e.g., a non-standard type), the actual node 16 sends the outgoing communication 20 to the associated dummy node. For example, a transaction may be a protected type of communication.

By replacing transaction broadcasts with suitably tuned I2P raw datagrams, the blockchain network may protect the users' anonymity even at the transport layer (the layer responsible for end-to-end communication over a network and that collects message segments and transmits them into the network). The blockchain anonymizing system can be used in conjunction with application-layer privacy-enhancing protocols, such as Anonymous Zether (which provides confidentiality by hiding payment amounts and anonymity by hiding the identities of senders and recipients).

Figure 5:
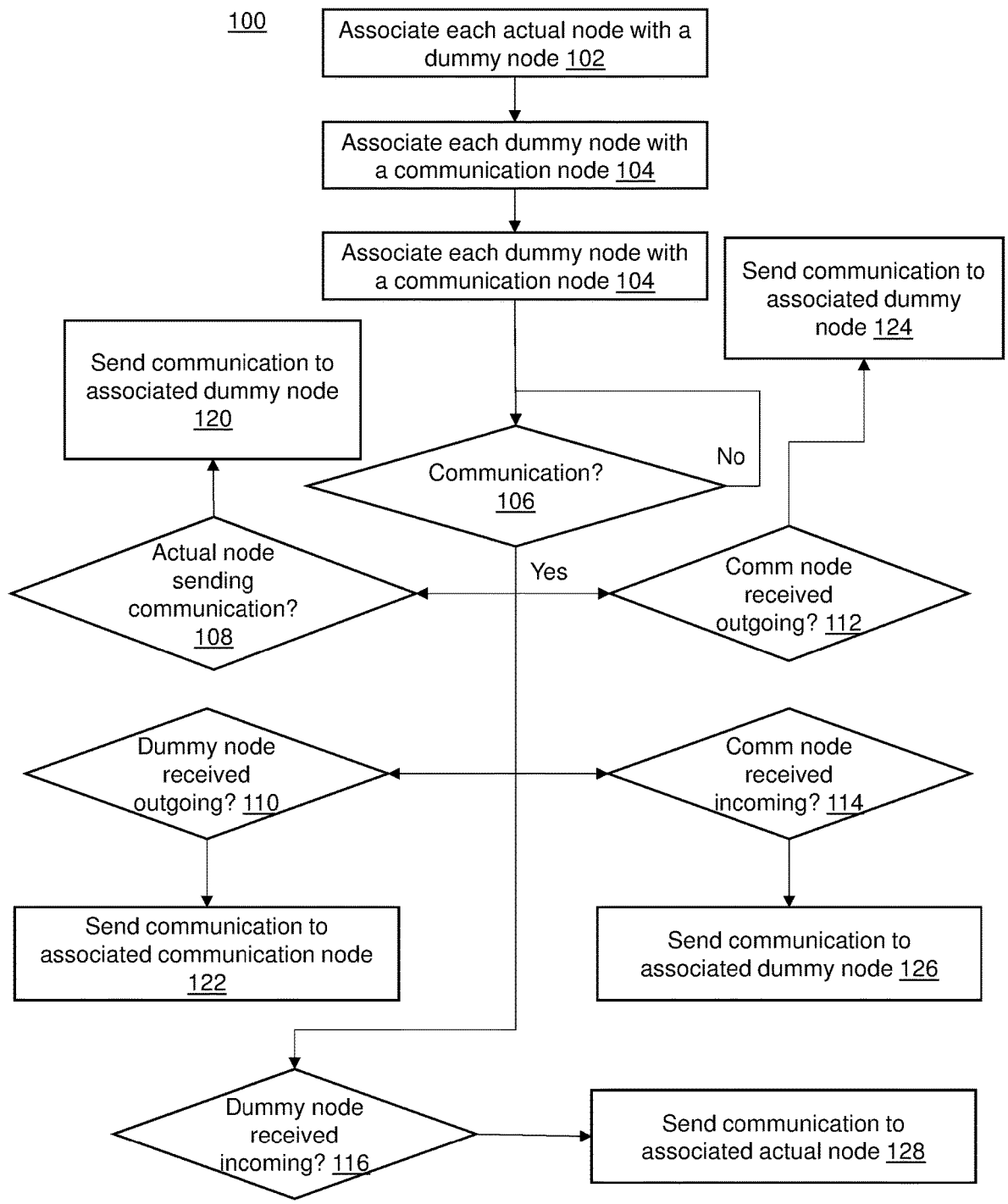
FIG. 5 is an embodiment of a method for providing side-channel-secure blockchain anonymity between actual nodes storing block of data forming a blockchain.

In the embodiment depicted in FIG. 5, a method 100 is shown for providing side-channel-secure blockchain anonymity between actual nodes 16 storing block of data forming a blockchain. In process block 102, each of the actual nodes 16 is associated with a dummy node 18. In process block 104, each of the dummy nodes 18 is associated with a communication node 19.

In decision block 106, a check is performed to determine if a communication 20 has been received by a dummy node 18 or communication node 19, or if an actual node 16 is sending an outgoing communication 20. If yes, processing moves to process block 108, 110, 112, 114, or 116.

In decision block 108, a check is performed to determine if one of the actual nodes 16 is sending an outgoing communication 20. If yes, the actual node 16 sends the outgoing communication 20 to the associated dummy node 18 in process block 120.

In decision block 110, a check is performed to determine if one of the dummy nodes 18 has received an outgoing communication 20 from an associated actual node 16. If yes, then the dummy node 18 passes the received outgoing communication 20 to the associated communication node 19 in process block 122.

In decision block 112, a check is performed to determine if one of the communication nodes 19 has received an outgoing communication 20. If yes, processing moves to process block 124 and the communication node 19 sends the received outgoing communication 20 to the recipient communication node 20 of the communication network 14 identified by the outgoing communication 20.

In decision block 114, a check is performed to determine if a communication node 19 received an incoming communication 20. If yes, in process block 126 the communication node 19 sends the received incoming communication 20 to the associated dummy node 18.

In decision block 116, a check is performed to determine if a dummy node 18 received an incoming communication

20. If yes, in process block 128 the dummy node 18 sends the received incoming communication 20 to the associated actual node 18.

As described above, in one embodiment a network protocol 32 is provided that includes computer readable instructions stored on a non-transitory computer readable medium 34 that, when executed by an electronic device 30, cause the electronic device to instantiate an actual node 16, instantiate a communication node 18, and instantiate a dummy node 19.

The protocol 32 also configures the actual node 16 to communicate with the communication network 14 through the dummy node 18 such that, when sending an outgoing communication 20, the actual node sends the outgoing communication 20 to the dummy node 18. The protocol 32 also configures the dummy node 18. When the dummy node 18 receives the outgoing communication 20, the dummy node 18 sends the received outgoing communication 20 to the communication node 19. When the dummy node 18 receives an incoming communication 20, the dummy node 18 sends the received incoming communication 20 to the actual node 16.

The protocol additionally configures the communication node 19. When the communication node 19 receives the outgoing communication 20, the communication node 19 sends the received outgoing communication 20 to a recipient communication node 19 of the communication network 14 identified by the outgoing communication 20, When the communication node 19 receives an incoming communication 20, the communication node 19 sends the received incoming communication to the associated dummy node 18.

Embodiments may require changes to the blockchain node's codebase to the effect of distinguishing between specially designated dummy peers and regular, non-protected peers to whom outbound transaction messages must be blocked. Embodiments may involve writing the dummy server, which is a manageable task in the case of Ethereum, for which ample server node capabilities already exist. This modularity may be important in the case of systems that may periodically rebase their codebases against upstream progress.

To use the system, an end-user may initiate a dummy peer and add it as a peer to the user's Ethereum node. This process may be automated using scripts.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety off orms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An anonymous blockchain network, formed by networked electronic devices, for side-channel-secure blockchain anonymity, the network comprising:
    actual nodes storing blocks of data forming a blockchain;
    dummy nodes, wherein each of the actual nodes is associated with one of the dummy nodes;
    a communication network including communication nodes, wherein each of the communication nodes is configured to communicate with other nodes of the communication network;
    wherein each of the dummy nodes is associated with one of the communication nodes;
    wherein each of the actual nodes is configured to:
        communicate with the other actual nodes by sending outgoing communications to the associated dummy node; and
        before sending outgoing communications to the associated dummy node:
            determine a type of the outgoing communication;
            when the type of the outgoing communication is a standard type, send the communication without sending the outgoing communication to the associated dummy node; and
            when the type of the outgoing communication is a protected type, send the outgoing communication to the associated dummy node;
    wherein each of the dummy nodes is configured to propagate outgoing communications by:
        receiving from the associated actual node an outgoing communication addressed to an intended recipient; and
        passing the received outgoing communication to the associated communication node; and
    wherein each of the dummy nodes is configured to propagate incoming communications by:
        receiving an incoming communication from the associated communication node; and
        sending the received incoming communication to the associated actual node; and
    wherein each of the communications nodes is configured to:
        send an incoming communication to the associated dummy node:
        send an outgoing communication to a recipient communication node of the other nodes of the communication network identified by the outgoing communication.

2. The network of claim 1, wherein each of the actual nodes instantiated the associated dummy node and the communication node associated with the associated dummy node, such that each of the actual nodes is executed on a same electronic device as the associated dummy node and the communication node associated with the associated dummy node.

3. The network of claim 1, wherein the communication network uses the Invisible Internet Project (I2P), such that the communications are encrypted end-to-end.

4. The network of claim 3, wherein each of the dummy nodes serves as an I2P-enabled inbound and outbound proxy for the associated actual node.

5. The network of claim 1, wherein the communication is a datagram.

6. The network of claim 5, wherein the datagram is a raw datagram including a header and payload, and the header is encrypted using a cryptographic tag.

7. The network of claim 1, wherein each of the dummy nodes complies with a peer-to-peer (P2P) communication protocol of the blockchain, such that the dummy node appears as one of the actual nodes to the associated actual node according to the P2P communication protocol.

8. A method for providing side-channel-secure blockchain anonymity between actual nodes storing block of data forming a blockchain, the method comprising:
    associating each of the actual nodes with a dummy node, wherein the dummy node is one of multiple dummy nodes;
    associating each of the dummy nodes with a communication node, wherein the communication node is one of multiple communication nodes of a communication network and the communication nodes are configured to communicate with other nodes of the communication network;
    when sending an outgoing communication, each of the actual nodes sends the outgoing communication to the associated dummy node;
    wherein before the actual node sends the outgoing communications to the associated dummy node:
        the actual node determines a type of the outgoing communication;
        when the type of the outgoing communication is a standard type, the actual node sends the communication to an intended recipient without sending the outgoing communication to the associated dummy node; and
        when the type of the outgoing communication is a protected type, the actual node sends the outgoing communication to the associated dummy node;
    when one of the dummy nodes receives the outgoing communication from the associated actual node, the dummy node passes the received outgoing communication to the associated communication node;
    when one of the communication nodes receives the outgoing communication, the communication node sends the received outgoing communication to the recipient communication node of the other nodes of the communication network identified by the outgoing communication;

when one of the communication nodes receiving an incoming communication, the communication node sends the received incoming communication to the associated dummy node;

when one of the dummy nodes receives an incoming communication, the dummy node sends the received incoming communication to the associated actual node.

9. The method of claim 8, further comprising each of the actual nodes instantiating the associated dummy node and the communication node associated with the associated dummy node, such that each of the actual nodes is executed on a same electronic device as the associated dummy node and the communication node associated with the associated dummy node.

10. The method of claim 8, wherein the communication network uses the Invisible Internet Project (I2P), such that the communications are encrypted end-to-end.

11. The method of claim 10, wherein each of the dummy nodes serves as an I2P-enabled inbound and outbound proxy for the associated actual node.

12. The method of claim 8, wherein the communication is a datagram.

13. The method of claim 12, wherein the datagram is a raw datagram including a header and payload, and the method further comprises encrypting the header includes using a cryptographic tag.

14. The method of claim 8, wherein each of the dummy nodes complies with a peer-to-peer (P2P) communication protocol of the blockchain, such that the dummy node appears as one of the actual nodes to the associated actual node according to the P2P communication protocol.

15. A network protocol comprising computer readable instructions stored on a non-transitory computer readable medium that, when executed by an electronic device, cause the electronic device to:
instantiate an actual node on a blockchain network;
instantiate a communication node of a communication network including other communication nodes;
instantiate a dummy node;
configure the actual node to communicate with the communication network through the dummy node such that;

when sending an outgoing communication, the actual node sends the outgoing communication to the dummy node; and before sending outgoing communications to the dummy node:
the actual node determines a type of the outgoing communication;
when the type of the outgoing communication is a standard type, the actual node sends the communication without sending the outgoing communication to the dummy node; and
when the type of the outgoing communication is a protected type, the actual node sends the outgoing communication to the dummy node;

configure the dummy node, such that:
when the dummy node receives the outgoing communication, the dummy node sends the received outgoing communication to the communication node;
when the dummy node receives an incoming communication, the dummy node sends the received incoming communication to the actual node;

configure the communication node, such that:
when the communication node receives the outgoing communication, the communication node sends the received outgoing communication to a recipient communication node of the other communication nodes of the communication network identified by the outgoing communication;
when the communication node receives an incoming communication, the communication node sends the received incoming communication to the associated dummy node.

16. The network protocol of claim 15, wherein when the dummy node sends the incoming communication to the actual node and when the actual node sends the outgoing communication to the dummy node, the incoming and outgoing communication complies with a peer-to-peer (P2P) communication protocol of the blockchain, such that the dummy node appears as one of the actual nodes to the associated actual node according to the P2P communication protocol.

17. The network protocol of claim 15, wherein the communication network uses the Invisible Internet Project (I2P) and the dummy nodes serves as an I2P-enabled inbound and outbound proxy for the associated actual node.

* * * * *